United States Patent [19]

Cooper et al.

[11] 4,139,574

[45] Feb. 13, 1979

[54] IMPACT RESISTANT POLYPHENYLENE ETHER RESIN COMPOSITIONS CONTAINING EPDM RUBBER-MODIFIED ALKENYL AROMATIC RESINS AND HYDROGENATED RADIAL TELEBLOCK COPOLYMERS

[75] Inventors: Glenn D. Cooper; Arthur Katchman, both of Delmar, N.Y.

[73] Assignee: General Electric Company, Pittsfield, Mass.

[21] Appl. No.: 855,252

[22] Filed: Nov. 28, 1977

[51] Int. Cl.$^2$ .............................................. C08L 63/00
[52] U.S. Cl. .............................. 260/836; 260/45.7 R; 260/45.7 P; 260/45.9 NP; 260/837 R; 260/873; 260/876 R; 260/876 B; 260/45.75 B
[58] Field of Search ............... 260/836, 859 R, 876 B, 260/876 R, 45.7 R, 45.7 P, 42.18, 873, 45.75 BB, 45.9 NP

[56] References Cited

U.S. PATENT DOCUMENTS

| | | | |
|---|---|---|---|
| 3,281,383 | 10/1966 | Zelinski | 260/23.7 |
| 3,658,945 | 4/1972 | Nakashio et al. | 260/876 R |
| 3,700,633 | 10/1972 | Wald et al. | 260/880 B |
| 3,943,191 | 3/1976 | Cooper et al. | 260/876 R |
| 3,960,808 | 6/1976 | Katchman | 260/876 |
| 3,981,841 | 9/1976 | Abolins et al. | 260/876 R |

OTHER PUBLICATIONS

Marrs et al., "Adhesive Age," Dec. 1971, pp. 15–20.
Haws et al., "Rubber World", Jan. 1973, pp. 27–32.

*Primary Examiner*—J. Ziegler
*Attorney, Agent, or Firm*—Morgan, Finnegan, Pine, Foley & Lee

[57] ABSTRACT

Novel compositions are disclosed which include a polyphenylene ether resin, an alkenyl aromatic resin modified with an EPDM rubber, and a hydrogenated radial teleblock copolymer. Also included within the scope of this invention are reinforced and flame-retardant compositions of said polyphenylene ether resin, said alkenyl aromatic resin modified with an EPDM rubber, and said hydrogenated radial teleblock copolymer.

38 Claims, No Drawings

IMPACT RESISTANT POLYPHENYLENE ETHER RESIN COMPOSITIONS CONTAINING EPDM RUBBER-MODIFIED ALKENYL AROMATIC RESINS AND HYDROGENATED RADIAL TELEBLOCK COPOLYMERS

This invention relates to improved compositions of a polyphenylene ether resin, an alkenyl aromatic resin that is modified with an EPDM rubber, and a hydrogenated radial teleblock copolymer. Reinforced and flame-retardant compositions are also provided.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al., U.S. Pat. Nos. 3,337,499; Blanchard et al., 3,219,626; Laakso et al., 3,342,892; Borman, U.S. Pat. Nos. 3,344,116, Hori et al., 3,384,619; Faurote et al., 3,440,217; Cooper et al., 3,661,848, 3,733,299, 3,838,102, and 3,988,297. Disclosures relating to metal based catalysts which do not include amines, are known from patents such as Wieden et al., U.S. Pat. Nos. 3,442,885 (copper-amidines); Nakashio et al., 3,573,257 (metal-alcoholate or -phenolate); Kobayashi et al., 3,455,880 (cobalt chelates); and the like. In the Stamatoff patents, the polyphenylene ethers are produced by reacting the corresponding phenolate ion with an initiator, such as peroxy acid salts, an acid peroxide, a hypohalite, and the like, in the presense of a complexing agent. Disclosures relating to non-catalytic processes, such as oxidation with lead dioxide, silver oxide, etc., are described in Price et al., U.S. Pat. No. 3,382,212. Cizek, U.S. Pat. No. 3,383,435 discloses polyphenylene ether-sytrene resin compositions. All of the above-mentioned disclosures are incorporated herein by reference.

In the prior art, rubber-modified styrene resins have been admixed with polyphenylene ether resins to form compositions that have modified properties. The Cizek patent, U.S. Pat. No. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers is improved.

Nakashio et al. U.S. Pat. No. 3,658,945 discloses that from 0.5 to 15% by weight of an EPDM-modified styrene resin may be used to upgrade the impact strength of polyphenylene ether resins. In Cooper et al., U.S. Pat. No. 3,943,191 it is disclosed that when the highly unsaturated rubber used in compositions of the type disclosed by Cizek, is replaced with EPDM rubber that has a low degree of residual unsaturation, the thermal oxidative stability and color stability are improved. The disclosures of the Nakashio et al. and Cooper et al. patents are incorporated herein by reference.

The impact strength of the Cooper et al. compositions is superior to that of a polyphenylene ether resin alone or that of similar compositions comprised of unmodified polystyrene; however, the impact strength of the Cooper et al. compositions is inferior to that of similar compositions comprised of polystyrene modified with polybutadiene rubber, such as a composition known as FG-834, available from Foster-Grant Co. As is disclosed in Abolins et al., U.S. Pat. No. 3,981,841, the disclosure of which is incorporated herein by reference, the impact strength of the Cooper et al. compositions can be improved by incorporating therein impact modifiers such as an emulsion-grafted EPDM polystyrene copolymer.

It is disclosed in copending, commonly assigned U.S. patent application Ser. No. 671,344, filed Mar. 29, 1976, that compositions of a polyphenylene ether resin, a styrene resin, and a radial teleblock copolymer of a vinyl aromatic compound and a conjugated diene, e.g., a styrene-butadiene radial teleblock copolymer, provide molded articles of good impact strength. In copending, commonly assigned U.S. patent application Ser. No. 752,024, filed Dec. 20, 1976, it is disclosed that compositions prepared from a polyphenylene ether resin, a styrene resin, and a hydrogenated radial teleblock copolymer of a vinyl aromatic compound and a saturated rubber provide molded articles of improved surface gloss. The disclosures of the above patent applications are incorporated herein by reference.

It has now been surprisingly discovered that when compositions are prepared from a polyphenylene ether resin, an EPDM rubber-modified alkenyl aromatic resin, and a hydrogenated radial teleblock copolymer, the resulting compositions provide molded articles of improved Izod impact strength and good melt viscosity.

It is, therefore, a primary object of this invention to provide improved compositions that are based on polyphenylene ether resins, modified alkenyl aromatic resins, and hydrogenated radial teleblock copolymers.

Another object of this invention is to provide molding compositions and molded articles that are based on a polyphenylene ether resin, an EPDM-modified alkenyl aromatic resin, and a hydrogenated radial teleblock copolymer that have improved Izod impact strength.

It is also an object of this invention to provide the above-described, improved molding compositions in reinforced and/or flame-retardant embodiments.

DESCRIPTION OF THE INVENTION

The above-mentioned advantages and objects and others will be readily apparent to those skilled in the art by the following compositions.

Preferred types will include thermoplastic compositions which comprise:
(a) a polyphenylene ether resin;
(b) an alkenyl aromatic resin modified with an EPDM rubber; and
(c) a hydrogenated radial teleblock copolymer comprised of a vinyl aromatic compound, a saturated rubber, and a coupling agent.

The preferred polyphenylene ethers are of the formula

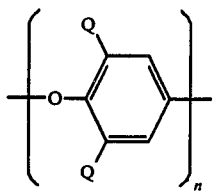

(I)

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly(2,6-dimethyl-1,4-phenylene) ether.

The alkenyl aromatic resin should have at least 25% of its units derived from an alkenyl aromatic monomer of the formula

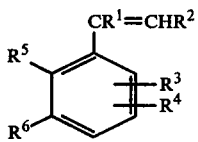

(II)

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group.

Specific examples of alkenyl aromatic monomers include styrene, bromostyrene, chlorostyrene, α-methylstyrene, vinyl-xylene, divinylbenzene, vinyl naphthalene, and vinyl-toluene.

The alkenyl aromatic monomer may be copolymerized with materials such as those having the general formula

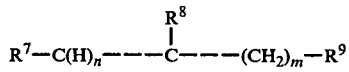

(III)

wherein the dotted lines each represent a single or a double carbon to carbon bond; $R^7$ and $R^8$ taken together represent a

linkage; $R^9$ is selected from the group consisting of hydrogen, vinyl, alkyl of from 1 to 12 carbon atoms, alkenyl of from 1 to 12 carbon atoms, alkylcarboxylic acid of from 1 to 12 carbon atoms, and alkenylcarboxylic acid of from 1 to 12 carbon atoms; n is 1 or 2, depending on the position of the carbon-carbon double bond; and m is an integer of from 0 to about 10. Examples include maleic anhydride, citraconic anhydride, itaconic anhydride, aconitic anhydride, and the like.

The alkenyl aromatic resins include, by way of example, homopolymers such as homopolystyrene and monochloropolystyrene, and styrene-containing copolymers, such as styrene-chlorostyrene copolymers, styrene-bromostyrene copolymers, the styrene acrylonitrile-α-alkyl styrene copolymers, styrene-acrylonitrile copolymers, styrene butadiene copolymers, styrene-acrylonitrile butadiene copolymers, poly-α-methylstyrene, copolymers of ethylvinylbenzene, divinylbenzene, and styrene maleic anhydride copolymers, and block copolymers of styrene butadiene and styrene-butadiene styrene.

The styrene-maleic anhydride copolymers are described in U.S. Pat. Nos. 2,971,939, 3,336,267, and 2,769,804, all of which are incorporated herein by reference.

The alkenyl aromatic resins are modified with EPDM rubbers, that is, rubbery interpolymers comprising mixtures of mono-olefins and a polyene, including those prepared from ethylene, an alpha-olefin, and a polyene. Preferred rubbery interpolymers comprise 10-90 mole percent of ethylene, 10-90 mole percent of an alpha-olefin containing 3-16 carbon atoms, and 0.1-12 mole percent of a polyene that is a non-conjugated cyclic or open-chain diene having 5-20 carbon atoms. Especially preferred are alpha-olefins having 3-10 carbon atoms and non-conjugated cyclic or open-chain dienes having 5-10 carbon atoms. Particularly preferred are those rubbery interpolymers comprised of ethylene, propylene, and a polyene.

Useful EPDM rubbers include the ethylene-propylene-ethylidene norbornene terpolymer and those described in Ritchie, *Vinyl and Allied Polymer*, Vol. 1, Page 121 (1968), which is incorporated herein by reference. The preferred EPDM rubbery interpolymers are those comprised of ethylene, propylene, and 5-ethylidene-2-norbornene; of ethylene, propylene, and 1,4-hexadiene; and of ethylene, propylene, and dicyclopentadiene. Preferred modified alkenyl aromatic resins will include from about 4 to about 25% by weight of rubbery interpolymer.

The alkenyl aromatic resin modified with an EPDM rubber may be prepared by dissolving the rubbery interpolymer in the alkenyl aromatic monomer and polymerizing the mixture, preferably in the presence of a free-radical initiator, until 90-100% by weight of the alkenyl aromatic monomer has reacted to form said EPDM-modified alkenyl aromatic resin.

The term "hydrogenated radical teleblock copolymer" refers to branched polymers having segments, or blocks, which are comprised of a saturated rubber, blocks of a vinyl aromatic polymer, and a coupling agent. More particularly, in the copolymer structure, several chains of the rubber, usually three or more, extend from a coupling agent, with each chain terminating at its other end with a block of the vinyl aromatic polymer. It is generally believed that incompatibility of the block segments in the radial teleblock copolymer promotes the formation of a two-phase system with blocks of the vinyl aromatic polymer coalescing to form discrete regions, or "domains". These domains simulate the effect of cross-links between the chains of elastomer, and a branched elastomeric network is thus formed comprising blocks of a saturated rubber, blocks of vinyl aromatic polymer, and a coupling agent.

Radial teleblock copolymers are known in the art. For instance, detailed descriptions of these materials are given by Marrs et al. in ADHESIVES AGE, December, 1971, pp. 15-20 and by Haws et al. in RUBBER WORLD, January, 1973, pp. 27-32, the disclosures of which are incorporated herein by reference.

Radial teleblock copolymers are available commercially or can be prepared by following the teachings of the prior art. As an illustration, they can be made by polymerizing conjugated dienes, e.g., butadiene, and vinyl aromatic compounds, e.g., styrene in the presence of an organometallic initiator, e.g., n-butyllithium, to produce copolymers which contain an active metal atom, such as lithium, on one end of each of the polymer chains. These metal atom-terminated polymers are then reacted with a coupling agent which has at least three active sites capable of reacting with the carbon-metal atom bonds on the polymer chains and replacing the metal atoms on the chains. This results in polymers which have relatively long branches which radiate from a nucleus formed by the poly-functional coupling agent. Such a method of preparation is described in detail in Zelinski et al., U.S. Pat. No. 3,281,383, which is incorporated herein by reference.

The coupling agents for radial teleblock copolymers can be chosen from among polyepoxides, polyisocyanates, polyimines, polyaldehydes, polyketones, polyanhydrides, polyesters, polyhalides, and the like. These materials can contain two or more types of functional groups, such as the combination of epoxy and aldehyde groups or isocyanate and halide groups. The coupling agents are described in detail in the above-mentioned U.S. Pat. No. 3,281,383.

The conjugated dienes of radial teleblock copolymers include compounds such as 1,3-butadiene, isoprene, 2,3-dimethyl-1,3-butadiene, 1,3-pentadiene, 3-butyl-1,3-octadiene, and the like.

The vinyl aromatic polymers may be prepared from vinyl aromatic compounds of Formula II. They include styrene, 1-vinylnaphthalene, 2-vinylnaphthalene, and the alkyl, cycloalkyl, aryl, alkaryl, and aralkyl derivatives thereof. Examples include 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl) styrene, and the like.

Hydrogenation of radial teleblock copolymers to form the hydrogenated radial teleblock copolymers (c) is known in the art and can be carried out by any of several known procedures. See by way of illustration, De Vault, U.S. Pat. No. 3,696,088, which is incorporated herein by reference.

In preferred compositions, the hydrogenated radial teleblock copolymer will be a radial teleblock copolymer of styrene and a saturated rubber, with terminal blocks derived from styrene, and a coupling agent selected from epoxidized polybutadiene, $SiCl_4$, polyisocyanates, polyaldehydes, polyhalogen substituted hydrocarbons such as 1,3,5-tri(bromoethyl)benzene or 2,5,6,9-tetrachloro-3,7-decadiene, or mixtures thereof. Especially preferred epoxidized polybutadiene coupling agents are available commercially under the tradenames Oxiron 2000 and Oxiron 2001 from Food Machinery Corporation. Coupling agents are discussed in U.S. Pat. No. 3,281,383, incorporated herein by reference.

The molecular weight of the hydrogenated radial teleblock copolymer and the ratios of the co-monomers thereof can vary broadly. In preferred embodiments the molecular weight of the hydrogenated radial teleblock copolymer will be from about 75,000 to about 350,000, and will comprise from 1 to 45 parts by weight of the vinyl aromatic compound and from 99 to 95 parts by weight of the saturated rubber, based on the weight of the radial teleblock copolymer. The amount of coupling agent in the copolymer will depend on the particular agent and the amount of organo-metallic initiator used. Generally, relatively small amounts of coupling agent, e.g., from 0.02 to 1 part by weight per 100 parts of resin are employed.

Preferred hydrogenated radial teleblock copolymers include Solprene 502 and 512 (containing about 70 parts by weight of hydrogenated butadiene units and about 30 parts by weight of styrene units), which are available commercially from Philips Petroleum Co., Stowe, Ohio. These materials also include a relatively minor amount of a coupling agent, e.g., less than 1 part by weight of a coupling agent per 100 parts by weight of copolymer.

Components (a), (b), and (c) are combinable in a fairly wide range of proportions. Preferably, the compositions of this invention will comprise from about 10 to about 65 parts by weight of polyphenylene ether resin (a), from about 90 to about 35 parts by weight of EPDM rubber-modified alkenyl aromatic resin (b), and from about 1 to about 25 parts by weight of hydrogenated radial teleblock copolymer (c), based on the total weight of the composition.

The compositions of the invention can also include other ingredients, such as flame retardants, extenders, processing aids, pigments, stabilizers, fillers such as mineral fillers and glass flakes and fibers, and the like. In particular, reinforcing fillers, in amounts sufficient to impact reinforcement, can be used, e.g., aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be understood that, unless the filler adds to the strength and stiffness of the composition, it is only a filler and not a reinforcing filler as contemplated herein. In particular, the reinforcing fillers increase the flexural strength, the flexural modulus, and the tensile strength.

Although it is only necessary to have at least a reinforcing amount of the reinforcement present, in general, the combination of components (a), (b), and (c) will comprise from about 10 to about 90 parts by weight and the filler will comprise from about 10 to about 90 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present. However, it is useful also to prepare the compositions containing substantially greater quantities, e.g., up to 70 to 80% by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.005 and 0.125 inch.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame-retardant. Sizings, if present, can readily be removed by heat cleaning or other techniques well known to those skilled in the art.

It is also a feature of this invention to provide flame-retardant thermoplastic compositions, as defined above, by modifying the composition to include a flame-retardant additive in a minor proportion but in an amount at least sufficient to render the composition self-extinguishing. Such flame-retardant compositions include a halogenated organic compound, a halogenated organic compound in admixture with an antimony compound, elemental phosphorus, a phosphorus compound, compounds containing phosphorus-nitrogen bonds, or a mixture to two or more of the foregoing.

When used herein, the terms "self-extinguishing" and "non-dripping" are used to describe compositions which meet the standards of Underwriters' Laboratories Bulletin No. 94. Another recognized procedure to determine flame resistance of resinous compositions is the Oxygen Index Test or LOI (Limiting Oxygen Index). This test is a measure of a product's combustibilty based on the oxygen content of the combustion atmosphere. Appropriate specimens are placed in a combustion chimney, and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test method D-2863. The compositions of this invention which contain flame-retardant additives in the specified amounts have a substantially higher oxygen index than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus, and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds; or a mixture of two or more of the foregoing.

The amount of flame-retardant additive used is not critical to the invention, so long as it is present in a minor proportion based on the polyphenylene ether-modified alkenyl aromatic polymer composition—major proportions will detract from physical properties—but at least sufficient to render the composition self-extinguishing. Those skilled in the art are well aware that the amount will vary with the nature of the polymers in the composition and with the efficiency of the additive. In general, however, the amount of additive will be from about 0.5 to 50 parts by weight per hundred parts of components (a), (b), and (c). A preferred range will be from about 1 to 25 parts, and an especially preferred range will be from about 3 to 15 parts of additive per hundred parts of (a), (b), and (c). Smaller amounts of compound highly concentrated in the elements responsbile for flame retardance will be sufficient, e.g., elemental red phosphorus will be preferred at about 0.5 to 10 parts by weight per hundred parts of (a), (b), and (c), while phosphorus in the form of triphenyl phosphate will be used at about 3 to 25 parts of phosphate per hundred parts of (a), (b), and (c), and so forth. Halogenated aromatics will be used at about 2 to 20 parts and synergists, e.g., antimony oxide, will be used at about 1 to 10 parts by weight per hundred parts of components (a), (b), and (c).

Among the useful halogen-containing compounds are those of the formula

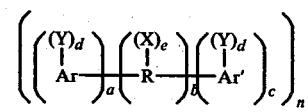

IV wherein n is 1 to 10 and R is an alkylene, alkylidene, or cycloaliphatic linkage, e.g., methylene, ethylene, propylene, isopropylene, isopropylidene, butylene, isobutylene, amylene, cyclohexylene, cyclopentylidene, and the like; or a linkage selected from the group consisting of ether; carbonyl; amine; a sulfur-containing linkage, e.g., sulfide, sulfoxide, or sulfone; carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be dihydric phenol, e.g., bisphenol-A, carbonate linkage. Other groups which are represented by R will occur to those skilled in the art. Compounds of this type are disclosed in U.S. Pat. Nos. 3,647,747 and 3,334,154, both of which are incorporated herein by reference.

Ar and Ar' are mono- or polycarbocyclic aromatic groups such as phenyl, biphenyl, terphenyl, naphthyl, and the like. Ar and Ar' may be the same or different.

X is a monovalent hydrocarbon group exemplified by the following: alkyl groups, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used, they may be alike or different.

Y is a substituent selected from the group consisting of organic, inorganic, and organometallic radicals. The substituents represented by Y include (1) halogen, e.g., chlorine, bromine, iodine, or fluorine, (2) ether groups of the general formula OE, wherein E is a monovalent hydrocarbon radical similar to X, (3) monovalent hydrocarbon groups of the type represented by R, and (4) other substituents, e.g., nitro, cyano, etc., said substituents being essentially inert provided there be at least one and preferably two halogen atoms per aryl, e.g., phenyl, nucleus.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0, and when b is 0, either a or c, but not both, may be 0. Where b is 0, the aromatic groups are joined by a direct carbon-carbon bond.

The hydroxyl and Y substituents on the aromatic groups, Ar and Ar', can be varied in the ortho, meta, or para positions on the aromatic rings, and the groups can be in any possible geometric relationship with respect to one another.

Included within the scope of the above formula are di-aromatics of which the following are representative:
2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,3-bis-(4,6-dichloronaphthyl)propane
2,2-bis-(2,6-dichlorophenyl)pentane
2,2-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane The preparation of these and other applicable biphenyls are known in the art. In the above examples sulfide, sulfoxy, and the like may be substituted in place of the divalent aliphatic group.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl, and halogenated diphenyl ethers containing from 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, or mixtures of at least two of the foregoing.

Especially preferred are hexabromobenzene and chlorinated biphenyls or terphenyls, alone, or mixed with antimony oxide.

In general, the preferred phosphorous compounds are selected from the group of elemental phosphorus and organic phosphonic acids, phosphonates, phosphine oxides, phosphines, phosphites, and phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

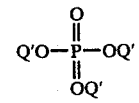   V and nitrogen analogs thereof where each Q' represents the same or different radicals including hydrocarbon radicals such as alkyl, cycloalkyl, aryl, alkyl substituted aryl, and aryl substituted alkyl; halogen; hydrogen; and combinations thereof provided that at least one said Q' is aryl. Typical examples of suitable phosphates include phenylbisdodecyl phosphate, phenylbisneopentyl phosphate, phenylethylene hydrogen phosphate, phenylbis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis-(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, and the like. The preferred phosphates are those where each Q' is aryl. The most preferred phosphate is triphenyl phosphate. It is also preferred to use triphenyl phosphate in combination with hexabromobenzene and, optionally, antimony oxide. Especially preferred is a composition comprised of mixed triaryl phosphates, with one or more isopropyl groups on some or all of the aryl rings, such as Kronitex 50 supplied by Food Machinery Corporation.

Also suitable as flame-retardant additives for this invention are compounds containing phosphorus-nitrogen bonds, such as phosphonitrilic chloride, phosphorus ester amides, phosphoric acid amides, or phosphonic acid amides. These flame-retardant additives are commercially available.

The compositions of the invention may be formed by conventional techniques, that is, by first dry mixing the components to form a premix, and then passing the premix through an extruder at an elevated temperature, e.g., 425° to 640° F.

By way of illustration, glass roving (a bundle of strands of filaments) is chopped into small pieces, e.g., ⅛" to 1" in length, and preferably less than ¼" in length and put into an extrusion compounder with (a) the polyphenylene ether resin, (b) the alkenyl aromatic resin that is modified with a rubbery interpolymer of a mixture of mono-olefins and a polyene, (c) the hydrogenated radial teleblock copolymer, and (d) the flame-retardant additive(s), to produce molding pellets. The fibers are shortened and predispersed in the process, coming out at less than 1/16" long. In another procedure, glass filaments are ground or milled to short lengths, are mixed with the polyphenylene ether resin, the modified alkenyl aromatic polymer, the hydrogenated radial teleblock copolymer, and, optionally, flame-retardant additive(s), by dry blending, and then are either fluxed on a mill and ground, or are extruded and chopped.

In addition, compounding should be carried out to insure that the residence time in the machine is short; that the temperature is carefully controlled; that the frictional heat is utilized; and that an intimate mixture between the resins and the additives is obtained.

DESCRIPTION OF THE PREFERRED EMBODIMENTS

The following examples are set forth as further illustration of the invention and are not to be construed as limiting the invention thereto.

EXAMPLES I and II

A premix comprised of 50 parts by weight of poly(2,6-dimethyl-1,4-phenylene)ether resin (PPO), and 50 parts by weight of Hoechst Chemical Company's XSLP, a rubber-modified polystyrene containing a terpolymer of ethylene, propylene, and 5-ethylidene norbornene, was prepared by dry mixing the components. A similar premix was prepared using 5 parts by weight of Solprene 502CX, a hydrogenated radial teleblock copolymer available from Philips Petroleum Co. Each premix was then compounded on a 28mm twin-screw extruder at about 500° F. The respective extrudates were cooled and chopped into pellets, and the pellets were molded into test bars on a Newbury injection molding machine. Premixes corresponding to the two above containing 35 parts by weight PPO and 65 and 60 parts by weight Hoechst XSLP, respectively, were also prepared. The compositions and mechanical test data are set forth in the following table:

Table 1.

| EXAMPLE | C-1* | I | C-2* | II |
|---|---|---|---|---|
| Composition (parts by weight)[a] | | | | |
| Poly(2,6-dimethyl-1,4-phenylene) ether resin | 50 | 50 | 35 | 35 |
| Hoechst XSLP | 50 | 45 | 65 | 60 |
| 502CX | — | 5 | — | 5 |
| Triphenyl phosphate | 3 | 3 | 7 | 7 |
| Tridecyl phosphite | 1.0 | 1.0 | 0.5 | 0.5 |
| Properties | | | | |
| Tensile yield, psi X 10³ | 10.6 | 9.38 | 8.42 | 7.1 |
| Elongation, % | 87.1 | 77.0 | 62.1 | 92.6 |
| Izod impact strength, ft.lbs./in. notch | 3.1 | 5.73 | 2.6 | 7.24 |
| Gardner impact strength, in./lbs. | 300 | 230 | 200 | 190 |
| Melt viscosity at 540° F, 1500 sec⁻¹ (poise) | 1900 | 1950 | 1240 | 1300 |

*Control
[a]Also containing 1.5 parts by weight polyethylene, 0.15 parts by weight zinc sulfide, and 0.15 parts by weight zinc oxide.

EXAMPLES III AND IV

Compositions were extruded and molded as described in Example I, the Solprene 502CX being replaced by Solprene 512, another hydrogenated radial teleblock copolymer available from Phillips Petroleum Company. Also, Hoechst XSLP polystyrene was replaced either by Taflite 925, an EPDM-modified polystyrene available from Mitsui-Toatsu Chemical Co., or by a small particle EPDM-modified polystyrene prepared according to the procedure described in commonly assigned U.S. patent application Ser. No. 787,253, filed April 13, 1977, incorporated herein by reference, by the polymerization of styrene containing 10% of Epcar 387, an ethylene-propylene-5-ethylidene-2-norbornene terpolymer available from B. F. Goodrich Chemical Co. Properties of the compositions are summarized in Table 2.

TABLE 2

| EXAMPLE | C-3* | III | C-4* | IV |
|---|---|---|---|---|
| Composition (parts by weight)[a] | | | | |
| Poly(2,6-dimethyl-1,4-phenylene) ether resin | 50 | 50 | 50 | 50 |
| Taflite 925 | 50 | 45 | — | — |
| Small-particle EPDM-polystyrene | — | — | 50 | 45 |
| Solprene 512 | — | 5 | — | 5 |
| Properties | | | | |
| Tensile yield (X 10³ psi) | 8.9 | 8.0 | 9.1 | 8.4 |
| Elongation (%) | 27 | 38 | 77 | 77 |
| Izod Impact (ft.lbs/in. notch) | 1.6 | 3.0 | 4.7 | 7.0 |
| Gardner Impact (in-lbs) | 40 | 110 | 200 | 290 |
| Melt viscosity at 540° F, 1500sec⁻¹ (poise) | 2300 | 2150 | 2750 | 2550 |

*Control
[a]Also containing 3 parts by weight triphenylphosphate, 1 part by weight decyldiphenyl phosphite, 1.5 parts by weight polyethylene 0.15 parts by weight zinc sulfide, and 0.15 parts by weight zinc oxide.

It can be seen from the above examples that polyphenylene ether compositions containing a hydrogenated radial teleblock copolymer have significantly improved Izod impact strength. More particularly, replacement of only 5 parts of EPDM-modified polystyrene by an equal weight of hydrogenated radial teleblock copolymer results in a large increase in Izod impact strength.

Obviously, other modifications and variations of the present invention are possible in the light of the above teachings. It is, therefore, to be understood that changes may be made in the particular embodiments described above which are within the full intended scope of the invention as defined in the appended claims.

We claim:

1. A thermoplastic molding composition which comprises an intimate admixture of:
   (a) a polyphenylene ether resin;
   (b) an alkenyl aromatic resin modified with a rubbery interpolymer of a mixture of mono-olefins and a polyene; and
   (c) a hydrogenated radial teleblock copolymer comprising a vinyl aromatic compound, a saturated rubber, and a coupling agent,
said composition having improved impact strength.

2. The molding composition of claim 1 wherein the polyphenylene ether resin is selected from compounds of the formula

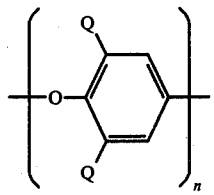

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and the halohydrocarbonoxy radicals having at least two carbon atoms between the halogen atom and the phenyl nucleus.

3. The molding composition of claim 1 wherein the alkenyl aromatic resin is prepared from a monomer selected from the group consisting of styrene, α-methylstyrene, bromostyrene, chlorostyrene, divinylbenzene, and vinyltoluene.

4. The molding composition of claim 1 wherein the alkenyl aromatic resin is modified with a rubbery interpolymer of ethylene, an alpha-olefin, and a polyene.

5. The molding composition of claim 4 wherein the alpha-olefin is propylene.

6. The molding composition of claim 1 wherein said rubbery interpolymer comprises 10–90 mole percent of ethylene, 10–90 mole percent of an alpha-olefin having 3–16 carbon atoms, and 0.1–12 mole percent of a polyene that is a non-conjugated cyclic or open-chain diene having 5–20 carbon atoms.

7. The molding composition of claim 6 wherein the alpha-olefin is propylene.

8. The molding composition of claim 1 wherein the hydrogenated radial teleblock copolymer (c) comprises from 1 to 45 parts by weight of the vinyl aromatic compound and from 99 to 55 parts by weight of the saturated rubber, and a relatively small amount of a coupling agent, based on the total weight of the hydrogenated radial teleblock copolymer.

9. The molding composition of claim 8 wherein, in the hydrogenated radial teleblock copolymer (c), the coupling agent is a polymer selected from the group consisting of polyepoxides, polyisocyanates, polyimines, polyaldehydes, polyketones, polyanhydrides, polyesters, and polyhalides.

10. The molding composition of claim 1 wherein, in the hydrogenated radial teleblock copolymer (c), the vinyl aromatic compound is styrene, the saturated rubber has terminal blocks derived from styrene, and the coupling agent is selected from the group consisting of epoxidized polybutadiene, SiCl$_4$, and mixtures thereof.

11. The molding composition of claim 1 wherein the polyphenylene ether resin (a) is present in an amount of from about 10 to about 65 parts by weight, the modified alkenyl aromatic resin (b) is present in an amount of from about 90 to about 35 parts by weight, and the hydrogenated radial teleblock copolymer (c) is present in an amount of from about 1 to about 25 parts by weight, based on the total weight of the composition.

12. The molding composition of claim 1 wherein said composition includes a reinforcing amount of an inorganic reinforcing filler.

13. The molding composition of claim 12 wherein said composition includes from about 10 to about 50% by weight of fibrous glass filaments, based on the total weight of the composition.

14. The molding composition of claim 1 wherein said composition includes a flame-retardant amount of a flame-retardant additive.

15. The molding composition of claim 14 wherein said flame-retardant is a halogenated organic compound, a halogenated organic compound in admixture with an antimony compound, elemental phosphorus, a phosphorus compound, compounds containing phosphorus-nitrogen bonds, or a mixture of two or more of the foregoing.

16. A thermoplastic molding composition which comprises an intimate admixture of:
(a) from about 10 to about 65 percent by weight of a polyphenylene ether resin;
(b) from about 35 to about 90 percent by weight of an alkenyl aromatic resin modified with a rubbery interpolymer which comprises 10–90 mole percent of ethylene, 10–90 mole percent of an alpha-olefin having 3–10 carbon atoms, and 0.1–12 mole percent of a polyene that is a non-conjugated cyclic or open chain diene having 5–10 carbon atoms; and
(c) from about 5 to about 25 percent by weight of a hydrogenated radial teleblock copolymer of styrene, hydrogenated butadiene, and an epoxidized polybutadiene coupling agent,
said composition having improved impact strength.

17. The molding composition of claim 16 wherein said polyphenylene ether resin is poly(2,6-dimethyl-1,4-phenylene) ether.

18. The molding composition of claim 16 wherein the alpha-olefin is propylene.

19. The molding composition of claim 16 wherein said alkenyl aromatic resin is styrene and said rubbery interpolymer is present between about 4% and about 25% by weight of styrene and rubbery interpolymer combined.

20. The molding composition of claim 16 wherein said rubbery interpolymer comprises 10–90 mole percent of ethylene, 10–90 mole percent of propylene, and 0.1–12 mole percent of 5-ethylidene-2-norbornene.

21. The molding composition of claim 16 wherein said rubbery interpolymer comprises 10–90 mole percent of ethylene, 10–90 mole percent of propylene, and 0.1–12 mole percent of 1,4-hexadiene.

22. The molding composition of claim 16 wherein said rubbery interpolymer comprises 10–90 mole percent of ethylene, 10–90 mole percent of propylene, and 0.1–12 mole percent of dicyclopentadiene.

23. A thermoplastic molding composition which comprises an intimate admixture of:
(a) from about 10 to about 65 percent by weight of a polyphenylene ether resin;
(b) from about 35 to about 90 percent by weight of an alkenyl aromatic resin modified with a rubbery interpolymer which comprises 10–90 mole percent of ethylene, 10–90 mole percent of an alpha-olefin having 3–10 carbon atoms, and 0.1–12 mole percent of a polyene that is a non-conjugated cyclic or open-chain diene having 5–10 carbon atoms;
(c) from about 5 to about 25 percent by weight of a hydrogenated radial teleblock copolymer of styrene, hydrogenated butadiene, and an epoxidized polybutadiene coupling agent; and (d) a reinforcing amount of an inorganic reinforcing filler, said composition having improved impact strength and reduced melt viscosity.

24. The molding composition of claim 23 wherein said polyphenylene ether resin is poly(2,6-dimethyl-1,4-phenylene) ether.

25. The molding composition of claim 23 wherein the alpha-olefin is propylene.

26. The molding composition of claim 23 wherein said reinforcing filler comprises from about 10 to about 50% of fibrous glass filaments, based on the total weight of the composition.

27. A thermoplastic molding composition which comprises an intimate admixture of:
(a) from about 10 to about 65 percent by weight of a polyphenylene ether resin;
(b) from about 35 to about 90 percent by weight of an alkenyl aromatic resin modified with a rubbery interpolymer which comprises 10–90 mole percent of ethylene, 10–90 mole percent of an alpha-olefin having 3–10 carbon atoms, and 0.1–12 mole percent of polyene that is a non-conjugated cyclic or open-chain diene having 5–10 carbon atoms;
(c) from about 5 to about 25 percent by weight of a hydrogenated radical teleblock copolymer of styrene, hydrogenated butadiene, and an epoxidized polybutadiene coupling agent; and
(d) a flame-retardant amount of a flame-retardant additive, said composition having improved impact strength.

28. The molding composition of claim 27 wherein said alpha-olefin is propylene.

29. The molding composition of claim 27 wherein said flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

30. The molding composition of claim 27 wherein said flame-retardant additive comprises a mixture of an organic bromine-containing compound with antimony oxide.

31. The molding composition of claim 27 wherein said flame-retardant additive is triphenylphosphate.

32. The molding composition of claim 27 wherein said flame-retardant additive is comprised of a mixture of triaryl phosphates wherein one or more aryl groups are substituted by one or more isopropyl groups.

33. A thermoplastic molding composition which comprises an intimate admixture of:
(a) a polyphenylene ether resin;
(b) an alkenyl aromatic resin that is modified with a rubbery interpolymer of a mixture of mono-olefins and a polyene by polymerizing alkenyl aromatic monomer in the presence of the rubbery interpolymer; and
(c) a hydrogenated radial teleblock copolymer comprising a vinyl aromatic polymer, a hydrogenated conjugated diene, and a coupling agent, said composition having improved impact strength and reduced melt viscosity.

34. The molding composition of claim 33 wherein the hydrogenated radial teleblock copolymer (c) comprises from 1 to 45 parts by weight of the vinyl aromatic polymer and from 99 to 55 parts by weight of the hydrogenated conjugated diene, and a relatively small amount of a coupling agent, based on the total weight of the hydrogenated radial teleblock copolymer.

35. The molding composition of claim 33 wherein the the hydrogenated radial teleblock copolymer (c), the vinyl aromatic polymer is styrene, the hydrogenated conjugated diene has terminal blocks derived from styrene, and the coupling agent is selected from the group consisting of epoxidized polybutadiene, $SiCl_4$, and mixtures thereof.

36. A thermoplastic molding composition which comprises an intimate admixture of:
(a) from about 10 to about 65 percent by weight of a polyphenylene ether resin;
(b) from 90 to 35 percent by weight of an alkenyl aromatic resin that is modified with a rubbery interpolymer which comprises 10–90 mole percent of ethylene, 10–90 mole percent of an alpha-olefin having 3–10 carbon atoms, and 0.1–12 mole percent of a polyene that is a non-conjugated cyclic or open-chain diene having 5–10 carbon atoms, by polymerizing alkenyl aromatic monomer in the presence of the rubbery interpolymer; and
(c) from about 5 to about 25 percent by weight of a hydrogenated radial teleblock copolymer of styrene, hydrogenated butadiene, and an epoxidized polybutadiene coupling agent, said composition having improved impact strength and reduced melt viscosity.

37. A thermoplastic molding composition which comprises an intimate admixture of:
(a) from about 10 to about 65 percent by weight of a polyphenylene ether resin;
(b) from 90 to 35 percent by weight of an alkenyl aromatic resin that is modified with a rubbery interpolymer which comprises 10–90 mole percent of ethylene, 10–90 mole percent of an alpha-olefin having 3–10 carbon atoms, and 0.1–12 mole percent of a polyene that is a non-conjugated cyclic or open-chain diene having 5–10 carbon atoms, by polymerizing alkenyl aromatic monomer in the presence of the rubbery interpolymer;
(c) from about 5 to about 25 percent by weight of a hydrogenated radial teleblock copolymer of styrene, hydrogenated butadiene, and an epoxidzied polybutadiene coupling agent; and
(d) a reinforcing amount of an inorganic reinforcing filler, said composition having improved impact strength and reduced melt viscosity.

38. A thermoplastic molding composition which comprises an intimate admixture of:
(a) from about 10 to about 65 percent by weight of a polyphenylene ether resin;
(b) from 90 to 35 percent by weight of an alkenyl aromatic resin that is modified with a rubbery interpolymer which comprises 10–90 mole percent of ethylene, 10–90 mole percent of an alpha-olefin having 3–10 carbon atoms, and 0.1–12 mole percent of a polyene that is a non-conjugated cyclic or open-chain diene having 5–10 carbon atoms, by polymerizing alkenyl aromatic monomer in the presence of the rubbery interpolymer;
(c) from about 5 to about 25 percent by weight of a hydrogenated radial teleblock copolymer of styrene, hydrogenated butadiene, and an epoxidized polybutadiene coupling agent; and
(d) a flame-retardant amount of a flame-retardant additive, said composition having improved impact strength and reduced melt viscosity.

* * * * *

UNITED STATES PATENT AND TRADEMARK OFFICE
CERTIFICATE OF CORRECTION

PATENT NO. : 4,139,574
DATED : February 13, 1979
INVENTOR(S) : Glenn D. Cooper and Arthur Katchman It is certified that error appears in the above-identified patent and that said Letters Patent are hereby corrected as shown below:

Column 6, line 38, "impact" should read -- impart --.

Column 12, line 36, insert a comma -- , -- between "polyethylene" and "0.15".

Signed and Sealed this

Sixteenth Day of October 1979

[SEAL]

Attest:

RUTH C. MASON
Attesting Officer

LUTRELLE F. PARKER
Acting Commissioner of Patents and Trademarks